Sept. 30, 1952 R. H. RINES 2,612,637
PULSE-ECHO TRACKING SYSTEM
Filed Nov. 29, 1946 3 Sheets-Sheet 1
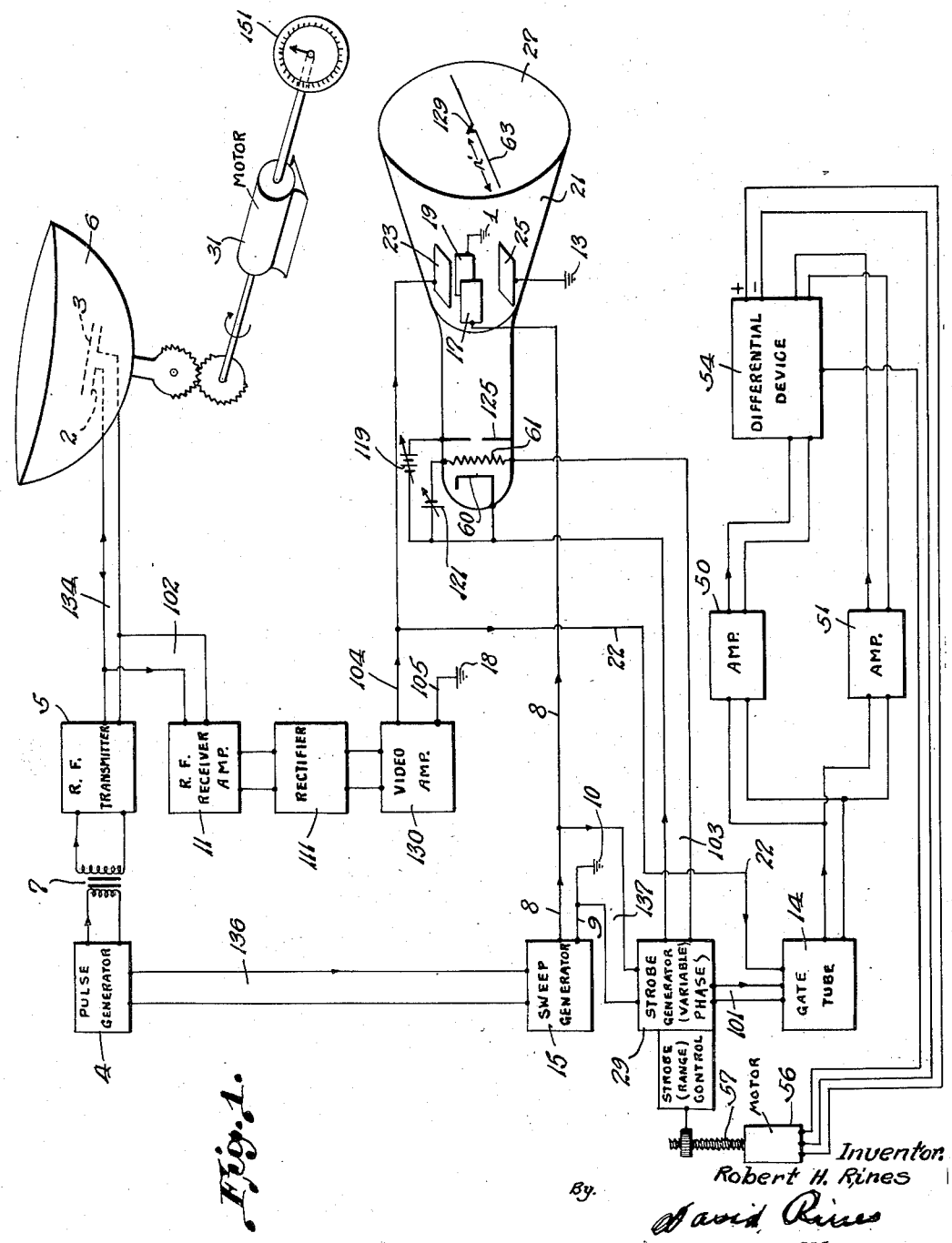
Inventor.
Robert H. Rines
By
Attorney.

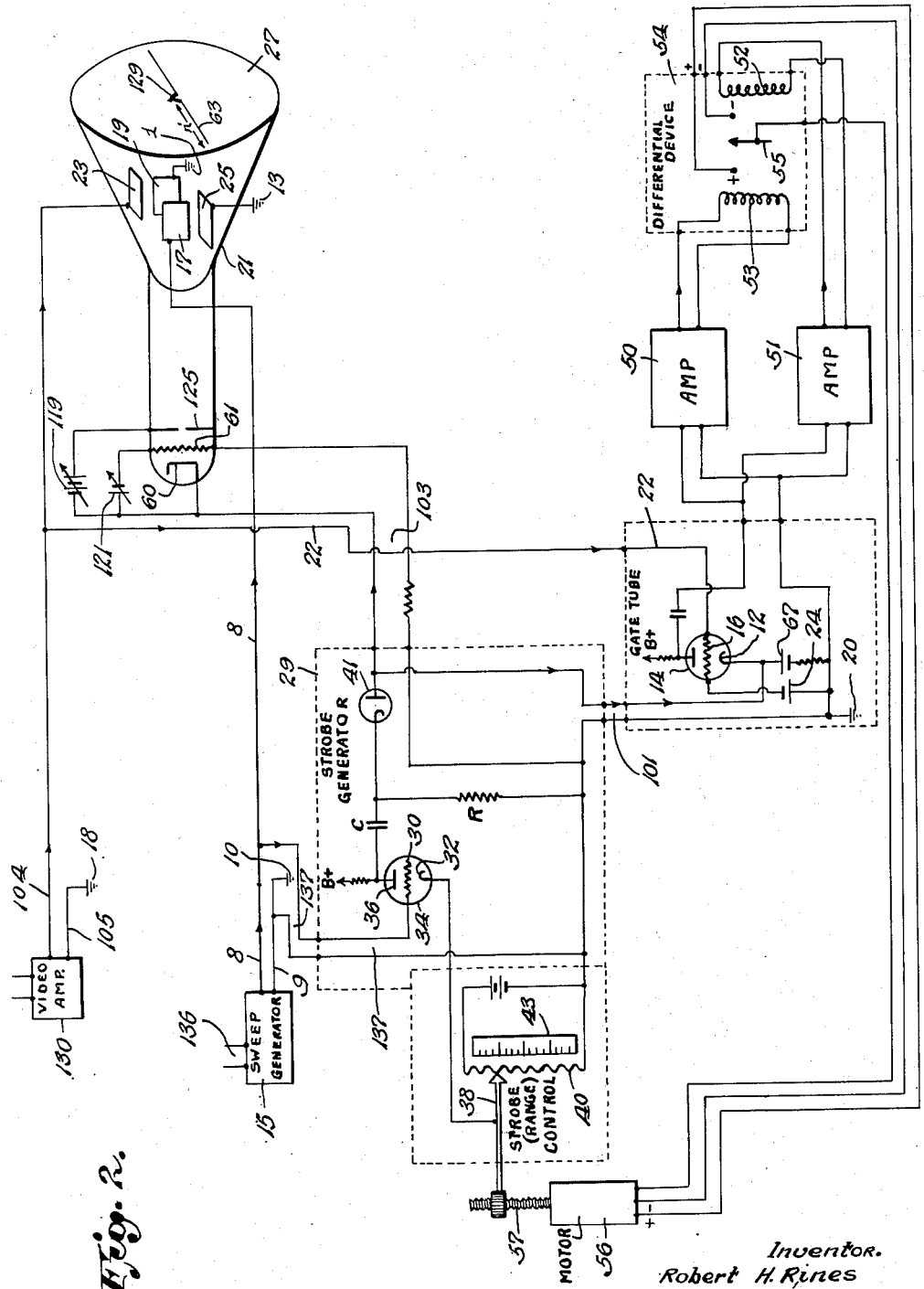

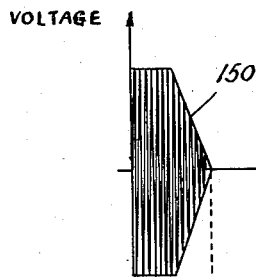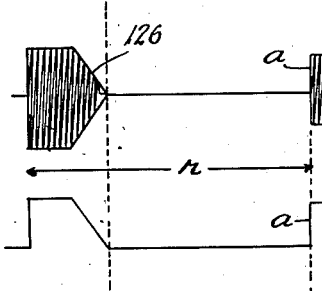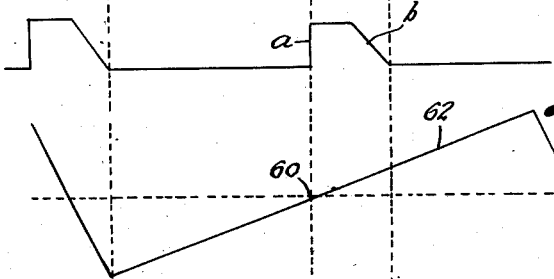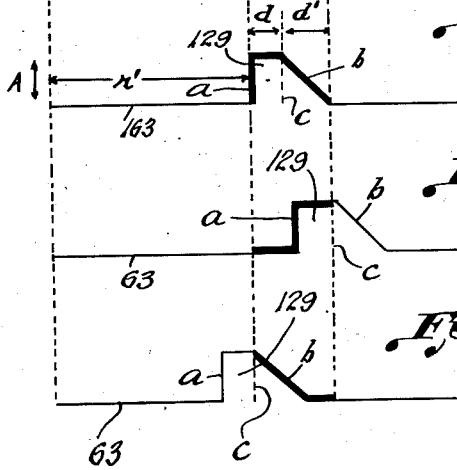

Patented Sept. 30, 1952

2,612,637

UNITED STATES PATENT OFFICE 2,612,637

PULSE-ECHO TRACKING SYSTEM

Robert Harvey Rines, Brookline, Mass.

Application November 29, 1946, Serial No. 713,010

22 Claims. (Cl. 343—13)

The present invention relates to electric systems, and more particularly to radio-receiving systems that, while having more general fields of usefulness, are especially adapted for use in radio location or automatic range-tracking. From a more specific aspect, the invention relates to systems of radio location or automatic range-tracking employing ultra-high-frequency pulsed-radio energy for detecting the range, the azimuth and the elevation of a body, and automatically following the body.

An object of the invention is to provide a new and improved system of the above-described character adapted for use with unsymmetrical slope pulses that have heretofore been undesirable for use in radio-location or radar practice.

A further object is to provide a new and improved system of the above-described character adapted for use with any type of unsymmetrical wave-form.

Still another object is to provide a new and improved radio-location system responsive to the dissymmetry of the unsymmetrical received pulses for automatically tracking the object from which the pulses are received.

Other and further objects will be explained hereinafter and will be particularly pointed out in the appended claims.

The invention will now be more fully explained in connection with the accompanying drawings, in which Fig. 1 is a diagrammatic view of circuits and apparatus arranged and constructed according to a preferred embodiment thereof; Fig. 2 is a similar view showing further details; and Figs. 3 to 10 are explanatory diagrams, drawn in relation to one another, diagrammatically illustrating the timing of the operation of the various parts.

A pulse generator 4 such, for example, as a multivibrator, is shown triggering a radio-frequency transmitter 5. The transmitter 5, by way of conductors 134, excites a dipole antenna 2 to produce ultra-high-frequency pulsed radio energy, say, of 3 or 1.5 centimeters wavelength. Such an output pulse of the radio-frequency transmitter 5 may, for example, be 2 micro-seconds wide, though narrower or wider pulses may be used.

In practice, the transmitted radio pulse becomes provided with an unsymmetrical-amplitude envelope, as shown at 150 in Fig. 3. This may result from the fact, for example, that the transmitter 5 is triggered from the pulse generator 4 through a saturated pulse transformer 7. It may, however, be produced also by other means, as though the use of unsymmetrical triggering pulses from the pulse generator 4, or of a "squegging" or a self-generating transmitter circuit. Such dissymmetry has been disadvantageous and even detrimental to the operation of many present-day radio-location and similar equipments. As will hereinafter appear, however, this dissymmetry is seized upon as an advantageous feature with the aid of which to practice the present invention.

The radio pulses emitted from the dipole 2 may be directed by a reflector 3 upon a directive antenna system, shown as a parabolic reflector 6. The parabolic reflector 6 may be rotated, as by a motor 31, to scan the area about it; for example, in azimuth or elevation. During such scanning, the parabolic reflector 6 may direct the waves toward a target object, say, an airplane, not shown, from which they may be reflected and scattered back toward the parabolic reflector 6 and the dipole 2. The returned pulsed-energy or radio-echo reflected signal, represented in Fig. 4 at 128, may then be fed, by way of the conductors 134 and conductors 102, to a radio-frequency receiver amplifier 11. Any well known superheterodyne system may be used as the receiver. One such is described in "Superheterodyne Reception of Micro-Waves," Reeves and Ullrich, Electrical Communications, vol. 16, No. 2, 1937; and another, on pages 551–556 of Proceedings of the Institute of Radio Engineers and Waves and Electrons, 1946, vol. 34, No. 8, in an article entitled "Radar" by Schneider. The receiver 11, of course, will receive also some of the energy of the transmitted pulse 150, as shown at 126 in Fig. 4. Transmitter-receiver devices, not shown, commonly called "T-R boxes," may be used to keep the transmitted energy out of the receiver, if desired, during the instants of transmission, as described on pages 549–551 of the said Institute of Radio Engineers volume.

The received radio-echo pulse 128, if the original pulse 150 is unsymmetrical, will naturally also be unsymmetrical. It will be rectified by a rectifier or detector 111 to produce direct-current pulses, and then amplified in video amplifiers 130, in well-known television fashion. Suitable apparatus for performing this function may be found described, for example, on page 749 of "Radio Engineering," by F. E. Terman, McGraw-Hill, 1937 edition, and on pages 554–555 of the said Institute-of-Radio-Engineers volume. The output of the video amplifiers 130 is represented as a direct-current pulse having the unsymmetrical envelope $a, b$ in Fig. 5.

The triggering pulses of the generator 4 travel, not only by way of the pulse transformer 7, to trigger the transmitter 5, and thereby to energize the dipole antenna 2, but also, by way of conductors 136, to a horizontal-sweep-generator circuit 15. The generator 15, as an illustration, may be of any conventional saw-tooth linear or non-linear type such, for example, as is illustrated on page 740 of the said "Radio Engineering," by Terman. It is shown connected, by conductors 8 and 9 and grounds 1 and 10, to the horizontally-spaced, vertically-disposed deflector plates 17 and 19 of a cathode-ray-tube oscilloscope 21. The periodically increasing voltage of the sweep generator 15 is fed, by way of the conductors 8 and 9 and the grounds 1 and 10, between these plates 17 and 19, to deflect the electron stream that passes from the cathode 60 of the oscilloscope 21, past its control-grid electrode 61 and its anode 125, finally to impinge on its fluorescent viewing-screen oscilloscope face 27. The saw-tooth charging sweep voltage corresponding to the output of the sweep generator 15 thus produced between the plates 17 and 19 is represented at 62 in Fig. 6. It becomes converted into a horizontal line or trace of illumination 63 on the screen 27, representing a horizontal-sweep-time base.

The grid electrode 61 is normally so biased negatively with respect to the cathode 60 by, say, a battery 121, as to permit the electron stream to produce a desired intensity of illumination upon the oscilloscope face 27. A B-battery 119 may constitute a source of supply between the cathode 60 and the anode 125.

The voltage of the video circuit amplifiers 130 is fed to the vertically-spaced, horizontally-disposed deflector plates 23, 25 of the oscilloscope 21 by way of conductors 104 and 105 and grounds 13 and 18.

The saw-tooth output voltage 62 of the horizontal-sweep generator 15 is fed also, by way of the conductors 8 and 9 and conductors 137, to between the grid 30 and the cathode 32 of the generating tube 34 of a variable-phase oscillator or strobe-generator 29. The strobe-generator 29 becomes thus triggered to produce pulses, as hereinafter described, in any desired phase relationship with respect to the start of the sweep voltage 62.

The strobe-generator 29 is provided with a strobe or range-control potentiometer 40, adjustable by means of a slider 38. Depending on the adjustment of the slider 38 on the potentiometer 40, the bias of the tube 34 is controlled in such manner that the tube 34 will start to conduct at different times relative to the start of the sweep voltage 62. Since the setting of the slider 38 determines the instant of triggering of the strobe-generator tube 34, it may be referred to as the strobe-control setting. The tube 34, for example, may start to conduct sharply at the point indicated at 60 in Fig. 6, representing the bias or cut-off level of the strobe generator 29. The output of the tube 34 is differentiated in a condenser-resistor circuit C—R and the differentiated output is passed through a rectifier 41 to select the initial differentiated signal occurring upon conduction of the tube 34.

The output of the strobe generator 29 becomes thus reduced to a short negative pulse 64, as shown in Fig. 7, occurring at the instant of time, relative to the start of the sweep 62, predetermined by the bias strobe-control setting of the slider 38. Further amplifiers, not shown, may be used, as well known in the art, to make the pulse 64 square. Other types of strobe generators or variable-phase multivibrators, used widely in the radar art, may, of course, be used similarly to the generator 29.

Since the strobe generator 29 produces a pulse output 64 at a time, along the sweep voltage 62 and, therefore, along the sweep-time base 63, that depends on the setting of the bias-strobe-control slider 38, the reading on the potentiometer scale 43 will be a measure of the time between the start of the sweep time base 63 and the occurrence of the pulse 64. The strobe pulse 64 may be of the same width as the transmitted radio pulse 150, or it may be slightly shorter or wider, depending on the values of the resistance of the resistor R and the capacitance of the differentiating capacitor C.

At the instant that the radio pulse 150 is transmitted from the dipole antenna 2 to the distant object, the tube, not shown, of the sweep generator 15 will have discharged to commence the charging sweep voltage 62, as described in the said Terman volume. This starts the sweep-time-base trace 63, which thereafter proceeds across the face 27 of the cathode-ray tube, say, from left to right. The radio echo 128, received by the dipole 2 from the target object, not shown, at a range $r$, arrives at the dipole 2 a time after the instant of transmission of the transmitted pulse 150 proportional to the range $r$ of the object, as shown in Fig. 4. Since the radio echo 128 received by the dipole 2, after rectification by the rectifier 11 and amplification by the amplifier 130, is fed to the vertically-spaced horizontally-disposed deflector plates 23 and 25, the sweep-time base 63 on the face 27 of the cathode-ray tube 21 is deflected vertically, as a vertical pulse 129, shown occurring at a distance $r'$ from the start of the sweep-time base 63 in Figs. 1, 2 and 8. As the distance $r'$ depends upon the time from the start of the sweep 63 to the time of receipt of the echo, it constitutes a measure of the range $r$ of the object, not shown. Actually, $r'$ is the range $r$ less a constant, namely the pulse width of the transmitted pulse, so that $r'$ is a measure of the range $r$. From a practical point of view, since the pulse width is very small, $r$ and $r'$ are essentially identical, at least to within the limits needed for even the most stringent of radio-location purposes.

The pulse output 64 of the strobe generator 29 is fed along two paths: first, by way of conductors 103, to between the grid 61 and the cathode 60 of the cathode-ray tube 21, in order to accelerate more electrons, and thus to brighten the sweep-time base 63 in the region or at the time of the sweep that the pulse 64 occurs; and secondly, by conductors 101, to open up a normally non-conducting gate tube 14.

With regard to the first of these paths, since the control electrode 61 of the cathode-ray tube 21 is biased negatively with respect to the cathode 60, the horizontal-sweep-time base 63 may not be very bright on the oscilloscope face 27. Upon the arrival from the strobe generator 29, by way of the conductors 103, however, of a brightening pulse 64 between the grid 61 and the cathode 60, the cathode 60 becomes rendered negative with respect to the control grid 61. The electrons emitted from the cathode 60 become thereupon accelerated, in the form of an increased stream, past the control grid 61 and the anode 125 of the oscilloscope 21, to impinge finally on the fluorescent oscilloscope face 27. A selected part of the sweep-time base 63, starting with a point along the sweep-time base 63 corresponding to the start of the pulse 64, will thereupon become brightened during the duration of the pulse 64. If the strobe setting of the slider 38 on the potentiometer 40 causes the pulse 64 to occur at a distance $r'$ along the sweep voltage 62 or the sweep-time base 63, then a portion of the time base 63 will be brightened, starting with a point at the distance $r'$ from the start of the time base for a portion equal in length along the time base 63 to the pulse width of the pulse 64.

Feeding the pulse 64 of the strobe generator 29 along the second path before mentioned, by way of the conductors 101, to the normally positively biased cathode 12 of the normally non-conducting and normally ineffective voltage-responsive-gate tube 14 will tend to overcome the cathode bias of a battery 67, thereby tending to render the gate tube 14 conducting. The control grid 16 of the gate tube 14 is negatively biased by a battery 24. Rectified echo pulses fed from the receiver 11 to the video amplifiers 130 are conveyed by conductors 104, 22 and 105, through a ground 20 and the ground 18, to the control grid 16 of the gate tube 14. If an echo pulse 128 should return at the time that the strobe-pulse setting of the slider 38 causes the pulse 64 to commence, therefore, it will arrive to overcome the grid bias of the battery 24 at a time when the negative strobe pulse 64 is being applied to the cathode 12 to overcome the bias of this cathode 12. The time and phase of the strobe pulse and the echo pulse will then coincide. The positive and negative biases produced by the batteries 67 and 24 upon the cathode 12 and the grid 16 will thus both be overcome, and the normally ineffective gate tube 14 will then open up and become effective to provide a pulse output. The pulse-output voltage of the gate tube 14, the same as appears represented at 129 in Fig. 8, centered in the strobe, appears in Figs. 1 and 2 as a brightened section of the sweep-time base 63 on the screen 27 of the cathode-ray tube 21.

If, therefore, the strobe setting of the slider 38 is adjusted so that part of the sweep is brightened where an echo 129 is occurring after reflection from an object, not shown, at a range $r$, then the echo 129 will be brightened as shown by the heavy lines in Fig. 8, and the setting of the slider 38 on the potentiometer 40, as read on the scale 43, will be a measure of the said range $r$. Strictly, as before explained, the reading will be $r$ less the constant distance corresponding to the short pulse width of the transmitted radio pulse.

For explanatory purposes, the unsymmetrical pulse 129 may be regarded as constituted of two adjacent voltage wave-forms. As shown in Fig. 8, for example, one of these two wave-forms may be a square or rectangular wave shape, indicated by the steeply rising leading edge $a$ and a steep dotted-line falling edge $c$, and the other an adjacently-disposed triangular or saw-tooth wave shape, indicated by the steep dotted-line rising edge $c$ and the more gradually sloping, trailing or falling edge $b$. As will hereinafter be explained, depending upon whether the target object, not shown, that is being tracked by the radio-location station is receding from or approaching toward the station, the output of the gate tube 14 will be substantially either a rectangular wave or a saw-tooth wave.

Any periodic voltage wave of any shape may be regarded, according to Fourier analysis, as constituted of an infinite number of different-frequencied periodic voltage-wave components of different amplitudes. A periodic square-wave or rectangular-wave voltage may therefore be obtained by adding a very large number of different-frequencied voltage signals. A symmetrical time periodic square-wave or rectangular-wave voltage $E(t)$, of unity amplitude and fundamental frequency $f$, where $t$ is the time, may be represented by the summation expression:

$$E(t) = \frac{2}{\pi}\left(\frac{\sin 2\pi ft}{1} + \frac{\sin 2\pi 3ft}{3} + \frac{\sin 2\pi 5ft}{5} + \ldots \frac{\sin 2\pi nft}{n}\right)$$

This wave form is constituted of the fundamental frequency $f$ and all its odd multiples, namely, the third harmonic $3f$, the fifth harmonic $5f$, and so on to the $n$th odd harmonic, $nf$. The corresponding symmetrical periodic saw-tooth-voltage wave, $E'(t)$, of unity amplitude and fundamental frequency $f$, is constituted, in addition to the frequencies comprising the square-wave voltage, of even-harmonic-frequency components $2f$, $4f$, etc.:

$$E'(t) = \frac{1}{\pi}\left(\frac{\sin 2\pi ft}{1} - \frac{\sin 2\pi 2ft}{2} + \frac{\sin 2\pi 3ft}{3} - \frac{\sin 2\pi 4ft}{4} + \ldots \frac{\sin 2\pi nft}{n}\right)$$

In both cases, the amplitudes of the harmonic are inversely proportional to the frequency, though the amplitudes of those of the frequency components common to the two waves are not numerically the same.

In the case of non-symmetrical time-periodic rectangular-wave and saw-tooth-wave voltages, furthermore, the amplitudes of those frequencies that are common to the two voltage signals are not the same in the two waves. The amplitude $C_n$ of each $n$th harmonic-frequency component present in the unsymmetrical square or rectangular wave, as the wave $a$, $c$ of Figs. 8 and 9, occurring once ever $T$ seconds, and having a peak amplitude A, and a time duration or width $d$, may be represented by:

$$C_n = \frac{2A}{n\pi} \sin \frac{\pi n d}{T}$$

The amplitude $C_n'$ of the $n$th harmonic-frequency component present in an unsymmetrical saw-tooth-wave voltage, such as $c$, $b$ of Figs. 8 and 10 is represented by $$C_n'\frac{A}{n\pi} = \frac{\sin \frac{\pi n d'}{T}}{\frac{\pi n d'}{T}} - 1$$

where $d'$ is the width of the saw-tooth wave.

It is therefore possible to discriminate between voltage signals of rectangular and saw-tooth-wave-amplitude envelopes either by selecting frequency components present in one and not in the other, or by making use of the fact that the amplitudes of those frequencies in common to the waves are different.

According to the present invention, the target object, not shown, is automatically tracked in response to the variations in the different-amplitude envelopes. This makes it possible to obtain continuous readings of the range $r$ of the moving object, and the angular position of the directive antenna system 6 providing data for the determination of the direction in azimuth or elevation of the object, not shown, as read off, for example, on a scale 151.

The combined square-wave, saw-tooth-wave unsymmetrical pulse voltage 129 illustrated in Fig. 8 that appears in the output of the gate tube 14, when it conducts, is fed to two further amplifiers 50 and 51. The amplifier 50 is shown feeding a coil 53 of a differential meter 54, and the amplifier 51 an opposing coil 52. A meter needle 55, responsive to the fields produced by the two opposing coils 52 and 53, will remain in a neutral or null position if the outputs of the two amplifiers 50 and 51 are equal.

The amplifier 51 may be tuned to certain frequencies of a saw-tooth wave that are dissimilar to or not present in a square wave, and the amplifier 50 may be tuned to certain square-wave-frequency components. In that event, if the output of the gate tube 14 contains certain of the frequency components constituted in the square wave, the amplifier 50 will respond strongly, and the amplifier 51 will not so respond; but, if, on the other hand, the output of the gate tube 14 contains certain of the saw-tooth-wave-component frequencies, the amplifier 51 will discriminatively strongly respond, but the amplifier 50 will not respond.

As an alternative, the amplifiers 50 and 51 may be tuned to common frequencies, and the biases may be so adjusted, in any desired manner, that, in view of the fact that the amplitudes of the common square-wave and saw-tooth frequencies are dissimilar, the amplifier 50 shall give the greater output if a square wave is present, and the amplifier 51 shall give the greater output if a saw-tooth wave is present. Either the lower-frequency components or the higher-video components of the waves may be used. The plurality of amplifiers 50 and 51, each selectively and discriminatively responsive to one or more of the frequency components of square or saw-tooth waves and to the distinctive amplitudes of these components, may obviously also be supplemented with further filtering networks, as is well known in the amplifier art.

When an operator has detected, on the oscilloscope face 27, a target object appearing as a deflection 129 on the sweep-time base 63, he may adjust the variable-phase strobe-control slider 38 to the proper position on the potentiometer 40 so as to aline the forward edge of the brightening section with the deflection 129, as illustrated by Fig. 8. Once the strobe pulse 64 has thus been adjusted so as to produce a brightened section or strobed region of the sweep-time base 63 centered on the echo 129, Fig. 8, by the adjustment of the slider 38 to the proper position on the potentiometer 40, the gate tube 14 will open up, as previously described, to give a pulse output of the shape of the pulse 129 in Fig. 8. The amplifiers 50 and 51, fed with the combination of the square wave and the saw-tooth wave making up the unsymmetrical pulse 129, are adjusted to give equal outputs, in order that the meter needle 55 shall occupy the neutral or null position. The strobe or lengthened section of the sweep is then "on target." The echo 129 may now be automatically followed or tracked constantly on the oscilloscope face 27 as the target, not shown, from which the radio waves are reflected, moves with respect to the radio-location station. There will thus be made available automatically, at the strobe-potentiometer-system slider 38, continuous-range readings that could be used for prediction and gun-directing purposes.

If the target, not shown, as represented by the echo 129, is increasing in range, the echo 129 will move out of the brightened strobe section of the sweep-time base 63, toward the right, as indicated in Fig. 9. Only the square-wave part or portion $a, c$ of the echo 129 will then be present in the strobe. As the output of the gate tube 14, at this time, contains only the distinctive frequency components of the square wave, as previously explained, the saw-tooth-wave components being lost, since the portion $c, b$ is lost outside the strobe, the amplifier 50 will have a greater output than the amplifier 51, causing the meter needle 55 to swing to the left, toward the plus position. The field coil of a motor 56 will thereupon become connected into circuit, with a polarity such that its screw-shaft 57 shall revolve in a direction such as to move the slider 38, say, up on the potentiometer 40, thereby increasing the bias on the strobe-generator tube 34.

With increasing bias, the strobe tube 34 will begin to conduct at a later time or phase than, for example, the instant along the sweep voltage 62 indicated at 60, Fig. 6. The brightening strobe section will therefore move out toward the right, until the strobe again covers the echo 129, to reproduce the "on-target" condition of Fig. 8. The tube 50 and the tube 51 will then again have equal outputs, and the needle 55 will again assume the neutral or null position. The new position of the slider 38 will then indicate the new range $r$ of the target, not shown, from which the radio echo 129 is now being received.

If, on the other hand, the target is decreasing in range, the echo 129 will move out of the strobe or brightened portion of the sweep-time base 63, toward the left, as shown in Fig. 10. Only the saw-tooth part or portion $c, b$ of the echo 129 will then be in the strobe section. The output of the gate tube 14 will thus contain the saw-tooth-voltage-component frequencies, with their respective amplitudes, the square-wave components now being lost, since the portion $a, c$ is lost outside the strobe. This results in a greater output in the amplifier 51 than in the amplifier 50. The meter needle 55 will then swing to the right, toward the minus position, connecting the field coil of the motor 56 so as to cause the motor 56 to turn in the opposite direction. The motor shaft 57 will then turn in the direction opposite to that previously described, effecting, say, a lowering of the slider 38 on the potentiometer 40, and decreasing the bias on the strobe-generator tube 34.

With this decrease in the bias or cut-off of the tube 34, the tube will conduct at a time earlier than is indicated, for example, by the point 60 along the sweep voltage 62, Fig. 6. The strobe or brightening section will thus move in, in range or distance, on the sweep 63, with the echo 129, until it will again cover the echo 129, similar to the condition represented in Fig. 8. The meter needle 55 will again assume the neutral or null position, and the new position of the slider 38 will indicate the new range $r$ of the target object.

The strobe control is thus moved automatically with increasing or decreasing range $r$ of the target being tracked by the radio-location station, to yield automatic and continuous readings of this range $r$. It is therefore possible automatically to follow the range $r$ of the unsymmetrical radio-echo signal from the distant object, not shown. In each case, a variable-phase signal or impulse-voltage wave 64 is superimposed, in the tube 14 and on the cathode-ray tube 21, on the unsymmetrical-amplitude-envelope reference echo signal constituted of the impulse-voltage wave 129. Any change in relative-phase relationship, as the echo signal attempts to move out of super-position or coincidence with the variable-phase signal, will result in producing further voltage outputs of the tube 14, containing distinctive voltage signals from either predominantly square-wave or saw-tooth-wave components, depending upon the direction in which the echo signal is moving. These further voltages, produced in response to the departure from the superposition of the variable-phase and the reference-echo signal, as a result of the dissymetry of the received echo signal, operate to modify the phase of the superimposing voltage signal, thereby to restore the variable-phase signal back into superposition or coincidence with the superimposed echo-voltage signal. The variable-phase and echo-reference signal voltages are thus always maintained automatically synchronized, to follow automatically the range $r$ of the radio-echo signal 129 of the distant object, not shown.

The invention has been described in connection with the use of an unsymmetrical voltage signal having a signal envelope comprising, in part, a steeply rising portion $a$ and, in part, a more gradual falling portion $b$, and upon which a variable-phase voltage signal is superimposed such that, when the steeply rising portion $a$ or the gradual falling portion $b$ of the unsymmetrical voltage signal envelope falls out of superposition with the variable-phase voltage signal 129, further voltages are produced to modify the phase of the variable-phase voltage signal, thereby to bring said signal back into superposition with the unsymmetrical signal. The invention is not, however, limited to the use of the described signal, but is operable with any other type of unsymmetrical voltage pulses where, for example, frequency or amplitude differentiation can be made between the various parts of the unsymmetrical voltage wave. Further modifications will also occur to persons skilled in the art, and all such are considered to fall within the spirit and the scope of the invention, as defined in the appended claims.

What is claimed is:

1. A radio-location-ranging system having, in combination, means for receiving radio-wave signals from a moving object, said signals having unsymmetrical rising and falling portions, means cooperative with the receiving means for indicating the range of the object, and means selectively responsive to the dissimilar characteristics of the rising and falling portions of the radio-wave signals for automatically controlling the indicating means to provide continuous and automatic readings of the range of the object.

2. A radio-location system having, in combination, means for receiving radio signals from an object, said signals having portions of unsymmetrical characteristics, cathode-ray-tube means for displaying the received signals, means for producing a variable-phase signal and for superimposing it on the displayed signals, means for indicating when a displayed signal starts to move out of superposition with the variable-phase signal and the direction in which it starts to move, and means cooperative with the indicating means and selectively responsive to the characteristic of that portion of the displayed signal still superposed by the variable-phase signal dissimilar to the characteristic of the portion of the signal out of superposition for automatically varying the phase of the variable-phase signal, thereby to restore superposition of the signals.

3. A radio-location system having, in combination, means for receiving pulses of radio waves from a moving object, said pulses having an envelope that steeply rises and then more gradually falls, and means cooperative with the receiving means and selectively responsive to the steeply rising and gradually falling characteristics of the pulse envelope for automatically tracking the range of the object in its movement.

4. A radio-location system having, in combination, means for receiving radio-impulse signals having a signal envelope comprising a steeply rising portion and a more gradually falling portion, means for producing variable-phase-voltage signals, means for causing the variable-phase-voltage signals and the radio-impulse signals to coincide in time and phase relationship, means cooperative with the last-named means for indicating when the radio-impulse signals and variable-phase-voltage signals have changed their time and phase coincidence and whether the change is in the direction running from the steep rising portion to the gradually falling portion of the envelope of the impulse signals or in the opposite direction, and means selectively responsive to the steeply rising and gradually falling characteristics of the radio-impulse signals as indicated by the last-named means and cooperative with the variable-phase voltage-signal-producing means for restoring the phase and time coincidence of the radio-impulse signals and the variable-phase-voltage signals.

5. A radio-location-ranging system having, in combination, means for receiving from a moving object radio-wave signals having a signal envelope comprising a rising portion having substantially the characteristics of a square or rectangular-wave voltage signal and a falling portion having substantially the characteristics of a triangular or saw-tooth-wave voltage signal, and means cooperative with the receiving means and selectively responsive to the rising and falling portions of the radio-signal envelopes for automatically tracking the range of the object.

6. A signal-control system having, in combination, means for producing a voltage signal comprising a plurality of portions each having distinctive frequency components one or more of which may become lost, a plurality of means each selectively responsive to one or more of the distinctive frequency components, means for indicating the presence or absence in the voltage signal of certain of the distinctive frequency components of corresponding portions of the voltage signal, and means responsive to the indicating means for restoring to the voltage signal the lost distinctive frequency component or components.

7. A signal-control system having, in combination, means for producing a voltage signal comprising a plurality of portions each having frequency components of distinctive voltage amplitudes one or more of which frequency components may become lost, a plurality of means each selectively responsive to one or more of the frequency components and to their respective distinctive voltage amplitudes, means for indicating the presence or absence in the voltage signal of certain of the frequency components of distinctive amplitude, and means responsive to the indicating means for restoring to the voltage signal the lost frequency component or components of distinctive amplitude or amplitudes.

8. A radio-location-ranging system having, in combination, means for receiving from a moving object radio-wave signals having a waveform comprising two portions of different shape, means for producing a variable-phase signal and for superimposing it upon a received signal to indicate the range of the object, means for producing a further voltage signal having substantially the shape of one of the portions of the radio-wave signal in response to a departure in one direction from the superposition of the radio-wave signal and the variable-phase signal and for producing still a further voltage signal having substantially the shape of the other portion of the two portions of the radio-wave signal in response to a departure in the opposite direction from the superposition of the radio-wave signal and the variable-phase signal, and means selectively responsive to the different shape characteristics of the further voltage signals for restoring the superposition of the radio-wave signal and the variable-phase signal, thereby continuously to indicate the range of the moving object.

9. A radio-location-ranging-system having, in combination, means for receiving from a moving object radio-wave signals having a wave-form comprising a steeply-rising portion and a more gradually falling portion, means for producing a variable-phase signal and for superimposing it upon a received signal to indicate the range of the object, means for producing a steeply-rising further voltage signal in response to a departure in one direction from the superposition of the radio-wave signal and the variable-phase signal and for producing a more gradually falling further voltage signal in response to a departure in the opposite direction from the superposition of the radio-wave signal and the variable-phase signal, and means selectively responsive to the steeply-rising and gradually falling characteristics of the further voltage signals for restoring the superposition of the radio-wave signal and the variable-phase signal, thereby continuously to indicate the range of the moving object.

10. A radio-location-ranging system having, in combination, means for receiving from a moving object radio-wave signals having portions of unsymmetrical frequency-component characteristics, means for producing a variable-phase signal and for superimposing it upon a received signal to indicate the range of the object, means for producing a further voltage signal having all of the frequency components of the radio-wave signal, means for varying the further voltage signal in response to a departure from complete superposition of the unsymmetrical radio-wave signal and the variable-phase signal so that the further voltage signal will have the frequency components of that portion of the radio-wave signal which is still superimposed upon the variable-phase signal, and means selectively responsive to the frequency components of the said still superimposed portion of the radio-wave signal for causing the said frequency components of the varied further voltage signal to restore the superposition of the unsymmetrical radio-wave signal and the variable-phase signal, thereby continuously to indicate the range of the moving object.

11. A radio-location system having, in combination, means for receiving pulses of radio waves from a moving object, said pulses having an envelope the rising and falling portions of which are unsymmetrical, means cooperative with the receiving means controlled in accordance with the range of the object, and means selectively responsive to the dissimilar characteristics of the rising and falling portions of the pulse envelope for controlling the second-named means automatically to determine the range of the object in its movement.

12. Apparatus of the character described having, in combination, means for receiving pulses of radio waves from an object, said pulses having an envelope the rising and falling portions of which are unsymmetrical, means for determining the direction of the object, means cooperative with the receiving means controlled in accordance with the range of the object and means selectively responsive to the dissimilar characteristics of the rising and falling portions of the pulse envelope for controlling the third-named means automatically to determine the range of the object.

13. A radio-location-ranging system having, in combination, means for receiving from an object pulses of radio waves having an envelope the rising and falling portions of which have common frequency components of differing amplitudes, means cooperative with the receiving means controlled in accordance with the range of the object, and means selectively responsive to the said differing amplitudes of the common frequency components in the rising and falling portions of the pulse envelope for controlling the second-named means automatically to determine the range of the object.

14. A radio-location-ranging system having, in combination, means for receiving from an object pulses of radio waves having an envelope the rising and falling portions of which have differing frequency components, means cooperative with the receiving means controlled in accordance with the range of the object, and means selectively responsive to the differing frequency components in the rising and falling portions of the pulse envelope for controlling the second-named means automatically to determine the range of the object.

15. An electric system having, in combination, means for producing relatively varying signal voltages one of which has portions of unsymmetrical characteristics, means for superposing the signal voltages, means for producing further voltages characteristically distinctive of one of the portions of the said one signal voltage in response to a departure from the superposition of the signal voltages, means for selectively responding to the distinctive characteristic of the said further voltages, and means controlled by the selectively responding means for restoring the superposition of the signal voltages.

16. An electric system having, in combination, means for producing relatively varying signal voltages one of which has portions of differing frequency-component characteristics, means for superimposing the signal voltages, means for producing further voltages having at least one frequency component distinctive of one portion of the said one signal voltage in response to a departure from the superposition of the signal voltages, means for selectively responding to the distinctive frequency component, and means controlled by the selectively responding means for restoring the superposition of the signal voltages.

17. An electric system having, in combination, means for producing relatively varying signal or impulse voltages one of which has portions of unsymmetrical characteristics, means for superimposing the signal or impulse voltages, means for producing further voltages characteristically distinctive of the different portions of the said one signal or impulse voltage in response to departures from the superposition of the signal or impulse voltages, discriminating means connected with the further-voltage-producing means for selecting characteristics of one portion of the said one signal or impulse voltage not present in the other portions, and means controlled by the discriminating means for restoring the superposition of the signal or impulse voltages.

18. A radio-location system having, in combination, means for receiving radio signals from an object having portions of differing frequency-component characteristics, means for superimposing a voltage signal upon the received signal, means for producing further voltages having at least one frequency component distinctive of one portion of the received signal when the received signal and the voltage signal move out of superposition, means for selectively responding to the distinctive frequency component, and means controlled by the selectively responding means for restoring the superposition of the voltage signal and the received signal.

19. An electric system having, in combination, means for producing a first voltage signal and a second voltage signal having a plurality of parts of different frequency-component characteristics, means for producing further voltages when one or more of the parts of the superimposed second voltage signal fall out of superposition with the superimposing first voltage signal having at least one frequency component distinctive of the still superposed part or parts of the second voltage signal, means for selectively responding to the distinctive frequency component, and means controlled by the selectively responding means for modifying the phase of the superposing first voltage signal to bring the superposing first voltage signal back into superposition with the superposed second voltage signal.

20. An electric system having, in combination, means for producing a variable-phase-voltage wave and a reference-voltage wave having portions of unsymmetrical characteristics, means for superimposing the variable-phase-voltage wave and the reference-voltage wave, means for producing further voltages characteristically distinctive of one of the portions of the reference-voltage wave as the voltage waves change in relative phase relationship, means for selectively responding to the distinctive characteristic of the said further voltages, and means controlled by the selectively responding means for bringing the phase of the variable-phase-voltage wave back into coincidence with the phase of the reference-voltage wave.

21. A radio-location system having, in combination, means for receiving from an object a radio-echo signal having portions of unsymmetrical characteristics, means for superimposing a voltage signal upon the echo signal, means for producing further voltage signals characteristically distinctive of one of the portions of the received echo signal when the echo signal moves out of superposition with the voltage signal, means for selectively responding to the distinctive characteristic of the said further voltage signals, and means controlled by the selectively responding means for restoring the superposition of the voltage and echo signals.

22. An electric system having, in combination, means for producing a first voltage signal and a second voltage signal having a signal envelope comprising a steeply rising portion and a more gradual falling portion, means for superimposing the voltage signals, means for producing further voltages having the distinctive characteristics of either the steeply rising or the gradual falling portions of the second voltage-signal envelope when the second voltage signal falls out of superposition with the superimposing first voltage signal, means selectively responding to the distinctive characteristics, and means controlled by the selectively responding means for modifying the phase of the first or superimposing voltage signal to bring the first voltage signal back into superposition with the second voltage signal.

ROBERT HARVEY RINES.

REFERENCES CITED

The following references are of record in the file of this patent:

UNITED STATES PATENTS

| Number | Name | Date |
|---|---|---|
| 1,712,051 | Round | May 7, 1929 |
| 1,987,730 | Cravath | Jan. 15, 1935 |
| 2,209,507 | Campbell | July 30, 1940 |
| 2,379,689 | Crosby | July 3, 1945 |
| 2,389,025 | Campbell | Nov. 13, 1945 |
| 2,389,948 | Bartels | Nov. 27, 1945 |
| 2,401,432 | Luck | June 4, 1946 |
| 2,412,612 | Godet | Dec. 17, 1946 |
| 2,416,088 | Deerhake | Feb. 18, 1947 |
| 2,416,562 | Alexanderson | Feb. 25, 1947 |
| 2,416,895 | Bartelink | Mar. 4, 1947 |
| 2,417,032 | Wolff | Mar. 4, 1947 |
| 2,417,248 | Godet | Mar. 11, 1947 |
| 2,418,143 | Stodola | Apr. 1, 1947 |
| 2,419,567 | Labin | Apr. 29, 1947 |
| 2,421,020 | Earp | May 27, 1947 |
| 2,422,074 | Bond | June 10, 1947 |
| 2,433,667 | Hollingsworth | Dec. 30, 1947 |
| 2,467,208 | Hahn | Apr. 12, 1949 |
| 2,482,544 | Jacobsen | Sept. 20, 1949 |
| 2,495,753 | Mozley | Jan. 31, 1950 |